April 18, 1967 S. J. WHITTAKER ETAL 3,314,139
METHOD OF BONDING OBJECTS OF DISSIMILAR METALLIC COMPOSITION
Filed Sept. 11, 1964
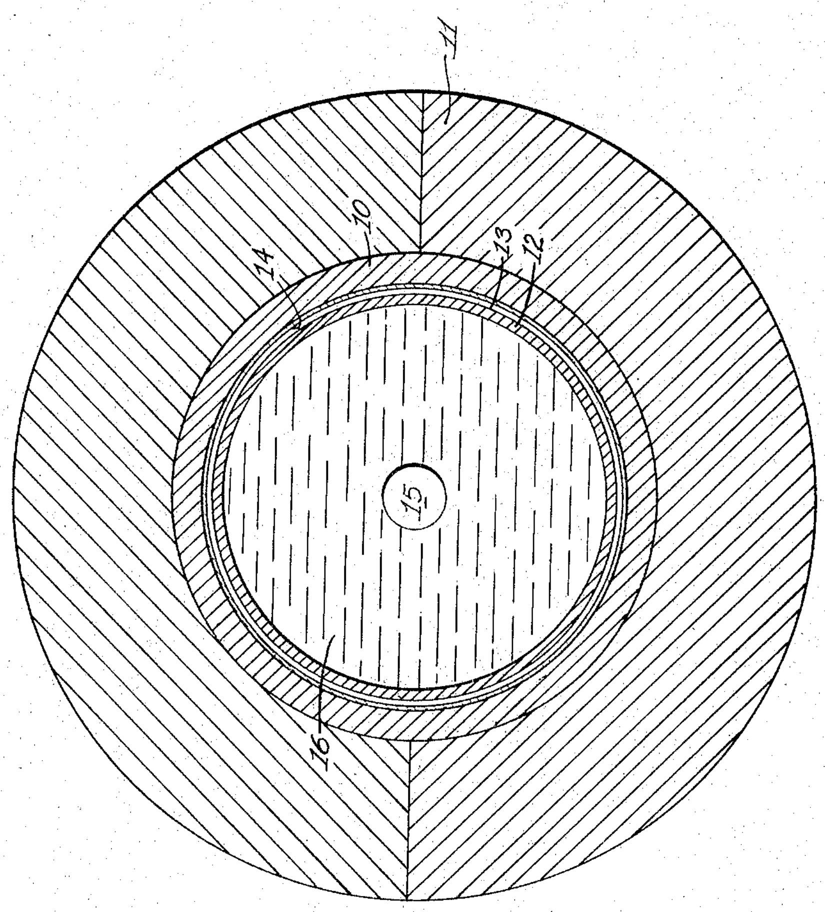
INVENTOR
Stanley J. Whittaker
Avrum W. D. Segel
BY
Harold A. Weir
PATENT AGENT United States Patent Office 3,314,139

Patented Apr. 18, 1967

3,314,139

METHOD OF BONDING OBJECTS OF DISSIMILAR METALLIC COMPOSITION

Stanley J. Whittaker and Avrum W. L. Segel, Deep River, Ontario, Canada, assignors to Atomic Energy of Canada Limited, Ottawa, Ontario, Canada, a corporation of Canada Filed Sept. 11, 1964, Ser. No. 395,716
5 Claims. (Cl. 29—470.1)

This invention relates to a method of bonding dissimilar metals by high rate energy release.

Several methods of bonding or joining dissimilar metals have heretofore been proposed. However, most of such methods result in interdiffusion of the atoms of the parent metals leading to the formation of intermetallic alloys which are often brittle and weaken the bond.

It is an object of this invention to provide a diffusionless bond between dissimilar metals whereby such bond is of improved strength and integrity.

The invention resides in a method of bonding two metallic objects of dissimilar metallic composition and strength which comprises providing a transition layer on a surface to be bonded of one of said objects, arranging said objects in juxtaposition to each other with a surface to be bonded of the other of said objects in spaced confronting relation with respect to said surface of said first one of said objects, placing a source of energy adjacent the one of said objects of lower strength, and releasing energy at an explosive rate from said source to impinge the metallic composition of one of said surfaces against the metallic composition of the other of said surfaces and thereby bond said surfaces together, said transition layer serving to prevent interdiffusion of the metallic compositions of said surfaces.

The invention will be described with reference to the accompanying drawing, in which the single figure is a sectional end elevation of a pair of metallic objects in course of bonding procedure in accordance with the invention.

In accordance with the invention, diffusionless bonding is achieved by introducing a third element as the transition layer between the two metal objects to which each will bond. As previously indicated, the third element prevents interdiffusion of the parent metals. A suitable transition layer is an oxide coating which may be promoted on the bonding surface of one of the metal objects. This coating must be thick enough to prevent penetration by the second metal, but not so thick as to become a brittle layer. The second metal object must present a "clean" bonding surface to the oxide layer of the first object.

The two metal objects are arranged in juxtaposition with the bonding surfaces thereof in closely spaced relationship to each other, with the object having the oxide layer thereon supported in such a manner that strain thereon will be minimized prior to bonding contact.

Preferably, the space between the metals is evacuated for several reasons, namely, (a) air trapped between the metal objects will generate heat under compression which favors the formation of intermetallics, (b) considerable energy is absorbed in compressing the air, (c) air can prevent intimate contact between the metals, and (d) air could promote a deleterious oxide film on the second metal object during the bonding procedure.

The bonding is accomplished by impinging one metal against the other under essentially impact conditions. To do this, energy must be released at a high rate by a procedure involving, for instance, the detonation of a high explosive, a spark discharge (or exploding wire), or the rapid buildup of a magnetic field. In the first two cases, energy transfer is optimized by having an efficient transfer medium such as water, beeswax or other fluid or plastic shock transmitters, between the energy source and the metal objects. The metal of lower strength is placed adjacent to the energy source. The energy source is distributed so that a uniform shock front will reach the metal in an orderly fashion, and reflected waves will not destructively interfere with the transmitted wave to reduce the energy reaching the metal.

The "clean" bonding surface of the second metal object is accomplished by means of two cleaning operations. Firstly, gross removal of oxides and contaminants is effected by normal brushing, degreasing and like steps. The second operation is effected by allowing sufficient strain during the bonding procedure to break up the new oxide film which will form on this surface after the normal cleaning step and during the time delay which will necessarily occur while the components are assembled for bonding. Due to the high speed of the process, further oxide formation between the instant that the oxide is broken up exposing fresh metal and the time that this metal actually contacts the other metal is prevented.

Objects of various metals may be bonded together in accordance with the invention. Thus, the procedure may involve the bonding of aluminum to stainless steel, aluminum to Zircaloy-2, and Zircaloy-2 to stainless steel. For the first two, the bond strength indicated by stud weld tests was in excess of 20,000 p.s.i., and for the last-mentioned, the bond strength indicated by a peel test was in excess of the tensile strength of the Zircaloy-2 that is, 100,000 p.s.i.

The drawing illustrates, by way of example, a manner of bonding two tubular metal objects. In the drawing, 10 is a stainless steel tube supported in a two-part container or die 11. The interior surface of the tube, which is to be bonded to the exterior surface 13 of a concentrically arranged aluminum tube 12, is provided with a thin oxide film 14 having a thickness of the order of 2±1 microns. The gap between the bonding surfaces is sized to permit the metal adjacent to the energy source to strain more than the elongation limit of its oxide film but less than its own elongation limit, and as previously indicated, this gap is evacuated.

An explosive 15 is axially located within the tubes. The explosive may have a detonation velocity in the neighbourhood of 20,000 to 30,000 feet per second in the region of the bonding surfaces. The space between the explosive and the interior surface of tube 12 is filled with water 16 as an energy transfer medium.

Bonding is effected by detonating the explosive 15 as previously explained.

We claim:

1. A method of bonding two objects of dissimilar metallic composition and strength which comprises providing an oxide coating on a surface to be bonded of a first one of said objects, arranging said objects in juxtaposition to each other with a surface to be bonded of the second one of said objects in spaced confronting relation with respect to said surface of said first one of said objects, placing an explosive adjacent the one of said objects of lower strength, evacuating the space between said surfaces, and detonating said explosive to release energy to cause impingement of the metal of one of said surfaces against the metal of the other of said surfaces and thereby bond said surfaces together.

2. A method of bonding two objects of dissimilar metallic composition and strength as defined in claim 1, including the step of placing an energy transfer medium between said explosive and said adjacent metal surface.

3. A method of bonding two objects of dissimilar metallic composition and strength as defined in claim 1, wherein said first object is of stainless steel, and said second object is of aluminum.

4. A method of bonding two objects of dissimilar metallic composition and strength wherein said first object is of Zircaloy-2 and said second object is of aluminum.

5. A method of bonding two objects of dissimilar metallic composition and strength as defined in claim 1, wherein said first object is of stainless steel and said second object is of Zircaloy-2.

References Cited by the Examiner

UNITED STATES PATENTS

| | | | |
|---|---|---|---|
| 3,025,596 | 3/1962 | Ward et al. | 29—471.1 |
| 3,036,374 | 5/1962 | Williams | 29—421 |
| 3,160,952 | 12/1964 | Corney et al. | 29—421 X |
| 3,182,392 | 5/1965 | Neal et al. | 29—421 |
| 3,218,704 | 11/1965 | Kraus et al. | 29—421 X |

JOHN F. CAMPBELL, *Primary Examiner.*

P. M. COHEN, *Examiner.*